United States Patent [19]
Nakamura et al.

[11] Patent Number: 5,386,519
[45] Date of Patent: Jan. 31, 1995

[54] INFORMATION PROCESSING APPARATUS INCORPORATING BUFFER STORING A PLURALITY OF BRANCH TARGET INSTRUCTIONS FOR BRANCH INSTRUCTIONS AND INTERRUPT REQUESTS

[75] Inventors: Takanori Nakamura; Hiroshi Katsuta, both of Tokyo, Japan

[73] Assignee: NEC Corporation, Tokyo, Japan

[21] Appl. No.: 917,286

[22] Filed: Jul. 23, 1992

[30] Foreign Application Priority Data

Jul. 24, 1991 [JP] Japan ................... 3-184245

[51] Int. Cl.[6] .................... G06F 9/26; G06F 9/30; G06F 9/38; G06F 9/42
[52] U.S. Cl. ..................... 395/375; 364/229.5; 364/230.1; 364/229.4; 364/240; 364/239; 364/242.2; 364/261.3; 364/261.5; 364/261.9; 364/262.9; 364/263.1; 364/DIG. 1; 364/DIG. 2; 395/800
[58] Field of Search ............... 395/800, 375, 650, 500, 395/550, 200, 325, 275, 425, 400, 725, 775, 250; 364/DIG. 1, DIG. 2

[56] References Cited

U.S. PATENT DOCUMENTS

| | | | |
|---|---|---|---|
| 3,940,741 | 2/1976 | Horikoshi et al. | 395/375 |
| 5,121,473 | 6/1992 | Hodges | 395/375 |
| 5,136,696 | 8/1992 | Beckwith et al. | 395/375 |
| 5,136,697 | 8/1992 | Johnson | 395/375 |
| 5,146,570 | 9/1992 | Hester et al. | 395/375 |
| 5,148,532 | 9/1992 | Narita et al. | 395/375 |
| 5,159,674 | 10/1992 | Stadlmeier et al. | 395/375 |
| 5,179,673 | 1/1993 | Steely, Jr. et al. | 395/375 |

FOREIGN PATENT DOCUMENTS

| | | |
|---|---|---|
| 0135844 | 8/1984 | European Pat. Off. . |
| 0179245 | 9/1985 | European Pat. Off. . |
| 0270310 | 11/1987 | United Kingdom . |

OTHER PUBLICATIONS

"Reducing the Branch Penalty in Pipelined Processors", David J. Lilja, Computer, vol. 21, No. 7, Jul. 1988, pp. 47-55.

Primary Examiner—Alyssa H. Bowler
Assistant Examiner—Daniel H. Pan
Attorney, Agent, or Firm—Sughrue, Mion, Zinn, Macpeak & Seas

[57] ABSTRACT

An information processing apparatus is provided with a buffer and accompanying circuitry for retrieving instruction code at a branch target address and providing that code to an execution unit within a single clock, much more quickly than the one bus cycle which has been required previously. Not only branches, but also interrupts may be handled with this relatively simple hardware, making the invention useful in the control field, among other applications. The buffer circuitry can store a plurality of branch target addresses and/or interrupt addresses.

10 Claims, 9 Drawing Sheets

FIG. 4A

| | | 321 | 322 | | 323 | |
|---|---|---|---|---|---|---|
| LINE BUFFER | 0 | 0 | — | — | | — |
| | 1 | 0 | — | — | | — |
| | 8 | 0 | — | — | | — |
| | 31 | 0 | — | — | | — |

FIG. 4B

| LINE BUFFER | 0 | 0 | — | — | — |
|---|---|---|---|---|---|
| | 1 | 0 | — | — | — |
| | 8 | 1 | 0000 0001 00B | INSTRUCTION AT 0111H | INSTRUCTION AT 0110H |
| | 31 | 0 | — | — | — |

FIG. 4C

| LINE BUFFER | 0 | 0 | — | — | — |
|---|---|---|---|---|---|
| | 1 | 1 | 0101 1010 10B | INSTRUCTION AT 5A83H | INSTRUCTION AT 5A82H |
| | 8 | 1 | 0000 0001 00B | INSTRUCTION AT 0111H | INSTRUCTION AT 0110H |
| | 31 | | | | | ial
INFORMATION PROCESSING APPARATUS INCORPORATING BUFFER STORING A PLURALITY OF BRANCH TARGET INSTRUCTIONS FOR BRANCH INSTRUCTIONS AND INTERRUPT REQUESTS

BACKGROUND OF THE INVENTION

The present invention relates to an information processing apparatus and, more particularly, to an improvement in a microcomputer as an information processing apparatus which must fetch an instruction at a branch address in order to change an instruction stream.

As well known in the art, while a microcomputer executes instructions in a current instruction stream in order, it is often required to change the current instruction stream in response to a conditional/unconditional branch instruction (called collectively a "branch instruction") or an interrupt request. In such a case, the microcomputer has to perform a bus cycle to fetch an instruction at a branch address of a main memory from which a new instruction stream starts. An instruction at a branch address will be called hereinafter a "branch target instruction".

In general, it takes several clock cycles for a microcomputer to perform a bus cycle for fetching each instruction from the main memory. Since instructions in one instruction stream are stored in consecutive memory addresses, however, recent microcomputers are equipped with an instruction prefetch unit for prefetching instructions from the main memory, during a period of time when an execution unit in the microcomputer is executing an instruction, without using a system bus coupled to the main memory. Accordingly, as long as the instructions in the same instruction stream are executed, the bus cycles for fetching such instructions do not cause substantially lower data processing speed and/or efficiency of the microcomputer.

However, when the microcomputer encounters a branch instruction or receives an interrupt request, it is necessary to perform a bus cycle for fetching a branch target instruction from a branch address which is different from the prefetch address. At this time, the instructions which have already been fetched in the microcomputer are made invalid. The execution unit has to wait for the branch target instruction until the bus cycle for fetching the same is completed. That is, the data processing operation is suspended temporarily each time a branch request responsive to the branch instruction or the interrupt request occurs. Data processing speed and/or efficiency are thereby lowered.

Some microcomputers include a branch prediction unit. This unit operates to detect the prefetching of the branch instruction, obtain a branch address, and then cause the prefetch unit to prefetch an instruction at that branch address (i.e., a branch target instruction) before the execution unit executes the branch instruction. When execution of the branch instruction results in a determination that the branch is to be taken, the execution unit receives and executes the branch target instruction which has already been fetched in the microcomputer. Thus, the bus cycle for fetching the branch target instruction is performed as an instruction prefetching operation and does not suspend the data processing operation of the microcomputer.

However, in the case of branch failure (i.e. a determination that the branch is not to be taken), a bus cycle for fetching an instruction following the branch instruction is required to invalidate the prefetched branch target instruction. This bus cycle causes temporary suspension of the data operation of the microcomputer. Moreover, the branch prediction unit does not answer the branch request responsive to the interrupt request. A bus cycle for fetching a branch target instruction for an interrupt subroutine program, which is performed after suspending the current program execution, is required each time the interrupt request occurs.

Some microcomputers further incorporate a cache memory for copying a string of instructions and/or data stored in the main memory. In this case, if a branch target instruction is copied into the cache memory, that instruction is read out therefrom and transferred to the execution unit at a high speed, one clock for example, in response to the branch request. However, the cache memory copies only instructions stored in addresses which are in the neighborhood of the address storing the instruction being currently executed. The branch target instruction required is not always stored in the cache memory.

FIG. 9 is a block diagram of a conventional microcomputer which includes an instruction cache. This structure incorporates a bus controller unit 620, an execution unit 630, an external data bus terminal 640, an internal bus 650, a cache controller unit 660, an instruction cache 670, and an instruction bus 680. The bus controller unit 620, which is connected to the internal bus 650, receives a fetch request signal 651 from the cache controller unit 660. The bus controller unit 620 controls data reading and writing to and from an on-chip or off-chip memory (not shown), and also control input/output (I/O) operation. The bus controller unit 620 further controls fetching of instruction code stored in a memory (not shown). The execution unit 630, connected to the internal bus 650 and instruction bus 680, outputs an instruction signal 652 to the cache controller unit 660. The execution unit 630 also decodes the instruction code supplied from the instruction bus 680 and controls execution logical and data transfer operations. The external bus terminal 640, which is connected to the internal bus 650, is a 16-bit terminal. The internal bus 650 is 16 bits wide and, in addition to be connected to the external bus terminal 640, also is connected to the bus controller unit 620, the execution unit 630, and the instruction cache 670.

The cache controller unit 660, which is connected to the bus controller unit 620, the execution unit 630, and the instruction cache 670, outputs a write signal 653 for writing an instruction code to the instruction cache 670. The cache controller unit 660 also commands the instruction cache 670 to output the instruction code in response to the instruction request signal 652 supplied from the execution unit 630. The instruction cache 670, connected to the internal bus 650, the cache controller unit 660, and the instruction bus 680, is responsive to the write signal 653 from the cache controller unit 660 to store an instruction code on the internal bus 650, and the address from which the instruction code has been read. If the cache controller 660 does not issue the write signal 653, the cache 670 outputs the stored instruction code on bus 680. The instruction bus 680, connected to the instruction cache 670 and the execution unit 630, sends the instruction code stored in the instruction cache 670 to the execution unit 630.

The microcomputer of FIG. 9 operates as follows. The execution unit 630 outputs the instruction request signal 652 to the cache controller unit 660, which compares the address information stored in the instruction cache 670 with an address generated in the bus controller unit 620. If there is coincidence (a condition known generally as a "cache hit"), the instruction code is supposed from the instruction cache 670 to the instruction bus 680. Since the instruction cache generally is comprised of high speed memory, the execution unit 630 can read and execute an instruction code at every clock cycle from the instruction bus 680 when there is a cache hit.

If the address information stored in the instruction cache 670 is different from the instruction address (a condition known generally as a "cache miss"), the cache controller unit 660 recognizes that the requested instruction code does not exist in the instruction cache 670, and supplies the fetch request signal 651 to the bus controller unit 620. The bus controller unit 620 starts a bus cycle for reading an instruction code from the main memory (not shown) through the external data bus terminal 640 and the internal bus 650. The cache controller unit 660 outputs a write signal 653, so that the read instruction code and address information from which the code is read are written into the instruction cache 670, and the instruction code applied simultaneously to the instruction bus 680. Until the bus cycle terminates, say after three clock periods, instruction code is not supplied to the execution unit 630, so that instruction execution is inhibited.

For the provision of the next read request of instruction code, the cache controller unit 660 also starts a write cycle for reading an instruction code, stored in main memory at an address equal to the address information stored in the instruction cache 670, and then writing that information to the instruction cache 670 through the data terminal 640 and the internal bus 650.

Two other deficiencies of this cache memory structure, in addition to those mentioned above, must be considered. First, the cache memory structure is relatively complicated. Second, cache operation is a statistical process; hence the need to take up precious bus cycles for fetches in the event of a cache miss. The statistical aspect of cache operation in the context of the handling of branch instructions becomes more apparent in view of branch target instruction decoding operations, which also were mentioned earlier. When a branch instruction, stored in a prefetch queue, is decoded, the branch target address is calculated before the branch instruction is executed, so that the instruction code at the branch target address is prefetched. The various prefetches include the prefetch of an unconditional branch (i.e. a branch that is always taken); the prefetch of a conditional branch using a prediction bit, and a prefetch of a branch address indication through an indirect address stored in a register.

The usual capacity of cache included in a large scale integration (LSI) chip is 32 pages of 16 bytes each. Though execution of instruction code at successive addresses, or the branch inside the page can be processed at high speed, the branch outside the page occurs often in the control field, where there are many branches, and there is a need to update the cache frequently. The cache size could be increased to 64 pages of 32 bytes each, but this requires an increase in chip area, with an unacceptable attendant increase in product cost, particularly in the control area. Even if an instruction cache were provided external to the microcomputer chip, an additional bus only for the cache, and cache control terminals are necessary, resulting in a larger LSI package size.

Still further, the prefetching of instructions at the branch target address requires an additional instruction decoder in the prefetch queue, and a buffer circuit for storing prefetched data. Yet another disadvantage is that the prefetch function can process only branch instructions, but not interrupts, which also occur frequently in the control field. Thus, even the more complicated hardware cannot handle all of the situations which can occur. Also, even if they could handle all situations, the statistical nature of the operation of the cache-based circuitry can result in the waste of precious bus cycles, and the necessity of flushing of the cache, when branches are not taken.

SUMMARY OF THE INVENTION

Therefore, one object of the present invention is to provide an improved microcomputer.

Another object of the present invention is to provide a microcomputer having improved data processing speed and/or efficiency.

Still another object of the present invention is to provide a microcomputer in which each of a plurality of branch target instructions can be transferred to an execution unit at high speed.

Still another object of the present invention is to provide a microcomputer in which a branch target instruction is supplied to an execution unit in one clock without needing complicated hardware.

A microcomputer according to the present invention is provided with a bus control unit performing a bus cycle for fetching an instruction from a memory and further performing a bus cycle for reading or writing data from or into the memory; an execution unit executing an instruction supplied thereto and issuing a branch request including address information representative of a branch address; and a branch target instruction buffer unit coupled to the bus control unit and the execution unit. Responsive to both the branch request from the execution unit and a control signal from the buffer unit, the bus control unit performs a bus cycle for fetching an instruction from the branch address of the memory and outputs the instruction as a branch target instruction.

The buffer unit includes a plurality of storage buffers each, when written, temporarily storing address information and an instruction associated with the stored address information, a detection circuit responding to the branch request from the execution unit to produce a detection signal of an active level when any one of the storage buffers stores address information that is the same as the address information included in the branch request. The detection circuit produces a detection signal of an inactive level when none of the storage buffers stores the address information that is the same as the address information included in the branch request, the detection signal of the inactive level being supplied to the bus control unit as the control signal.

A selection control circuit selects and supplies the instruction read out of the storage buffer to the execution unit in response to the active level of the detection signal and selects and supplies the branch target instruction outputted from the bus control unit to the execution unit in response to the inactive level of the detection signal.

An information updating circuit responds to the inactive level of the detection signal to write into one storage buffer the branch target instruction and address information representative of the branch address.

Thus, when a branch target instruction to be fetched by the branch request responsive to the execution of a branch instruction or an interrupt request is held in the buffer unit, it is transferred immediately to the execution unit without performing a bus cycle for fetching the branch target instruction. If the required branch target instruction is not held, a bus cycle is required to fetch it. However, the fetched branch target instruction is held in the buffer unit. Therefore, the buffer unit can transfer the stored branch target instruction to the execution unit in response to the next or following branch request.

BRIEF DESCRIPTION OF THE DRAWINGS

The above and other objects, advantages and features of the present invention will be more apparent from the following description taken in conjunction with the accompanying drawings, in which:

FIGS. 4A to 4C are diagrams explaining how the contents of a buffer shown in FIG. 1 are updated in the course of the operation of the present microcomputer;

DETAILED DESCRIPTION OF THE PREFERRED EMBODIMENTS

Figure 1:
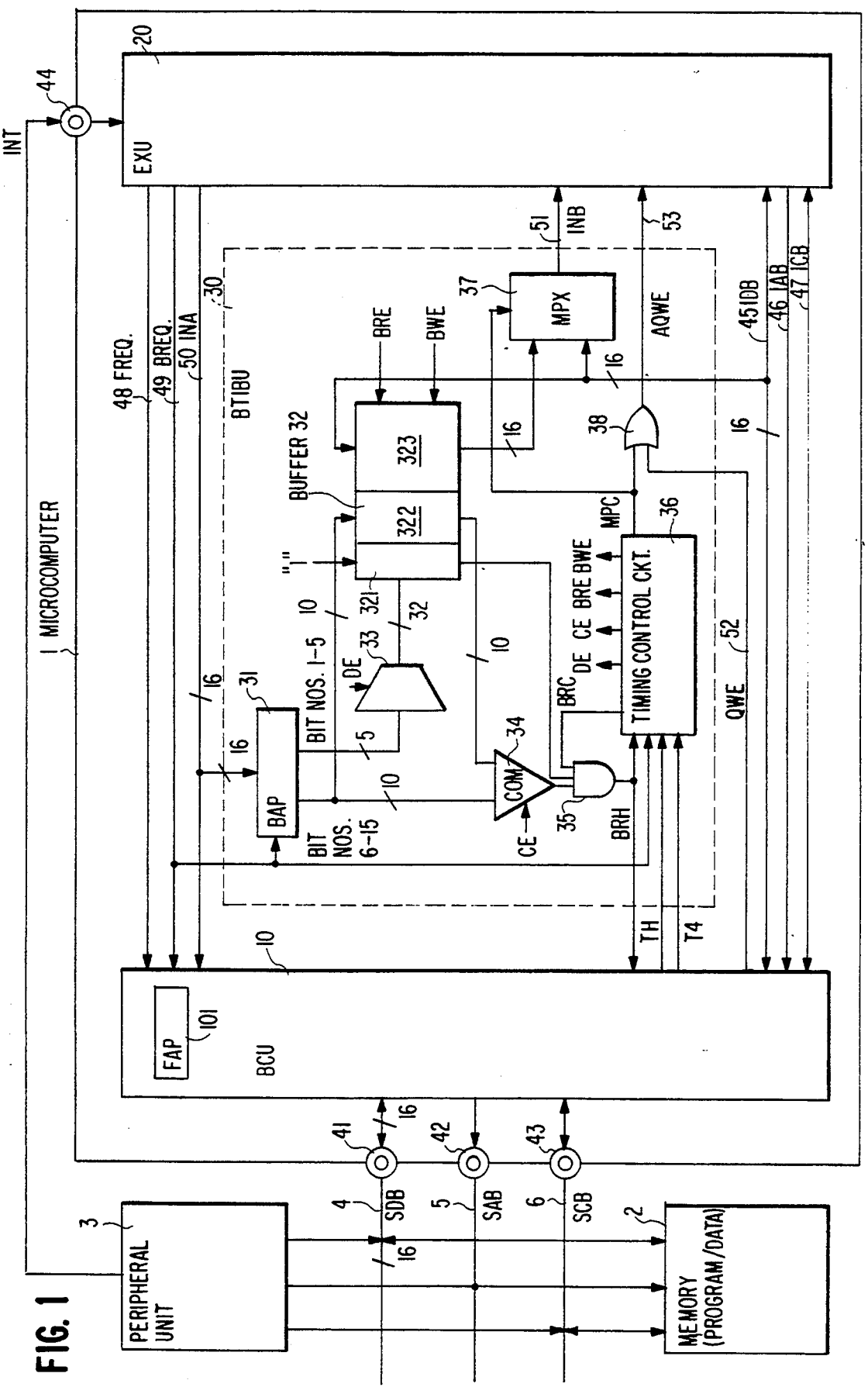
FIG. 1 is a block diagram representative of an information processing apparatus employing a microcomputer according to an embodiment of the present invention.

Referring to FIG. 1, a microcomputer 1 according to an embodiment of the present invention is fabricated on a single semiconductor chip as a 16-bit microcomputer and is interconnected to a memory 2 and a peripheral unit 3 via a system bus which includes a system data bus (SDB) 4, a system address bus (SAB) 5, and a system control bus (SCB) 6. The memory 2 stores a program and operand data. The SDB 4 is 16 bits wide. The SAB 5 is also 16 bits wide to support a 64K-byte address space. The SDB 4, SAB 5, and SCB 6 are connected respectively to a set of data terminals 41, a set of address terminals 42 and a set of control terminals 43 of the microcomputer 1. The microcomputer 1 also has an interrupt terminal 44 supplied with an interrupt request signal INT from the peripheral unit 3.

The microcomputer 1 includes a bus control unit (BCU) 10 and an execution unit (EXU) 20 and further includes a branch target instruction buffer unit (BTIBU) 30 in accordance with the present invention. The BCU 10 and the EXU 20 are interconnected with each other via an internal bus consisting of a 16-bit wide internal data bus (IDB) 45, an internal address bus (IAB) 46, and an internal control bus (ICB) 47. In response to an operand data access request supplied via the internal bus from the EXU 20, the BCU 10 preforms a bus cycle for reading or writing operand data from or into the memory 2 or the peripheral unit 3. The EXU 20 further supplies to the BCU 10 a fetch request (FREQ) signal 48 to inform the BCU 10 of an instruction prefetch request and a branch request (BREQ) signal 49 to inform the BCU 10 of a branch request responsive to the execution of a branch instruction or an interrupt request.

When the BREQ signal 49 is generated, the EXU 20 further supplies to the BCU 10 a 16-bit branch address via an instruction address bus (INA) 50. The BCU 10 includes an instruction prefetch pointer (FAP) 101 whose content indicates the address of the memory 2 from which an instruction is to be prefetched. Accordingly, the BCU performs a bus cycle for fetching an instruction from the memory 2, incrementing the content of the FAP 101 each time the FREQ signal 48 is generated from the EXU 20. When a BREQ signal 49 is generated, the branch address on the INA 50 is latched in the FAP 101. The BCU 10 then performs a bus cycle for fetching an instruction. Each of the bus cycles for fetching an instruction and for accessing to operand data consists of first to fourth states T1 to T4 (see, e.g. FIG. 3). However, in the instruction fetch cycle responsive to the branch request signal BREQ 49, when a branch hit signal BRH produced from the BTIBU 30 takes an active high level, a hit state TH is inserted at the beginning of the instruction fetch bus cycle consisting of the T1 to T4 states. Each of the states T1 to T4 and TH has a period of time corresponding to one clock cycle of a system clock signal (not shown) supplied to the microcomputer 1.

The operand data read out of the memory 2 or the peripheral unit 3 are transferred through the SDB 4 and IDB 45 to the EXU 20. On the other hand, the instruction fetched from the memory 2 is transferred to the EXU 20 through SDB 4 and IDB 45 and further through a multiplexer (MPX) 37 in the BTIBU 30 and an instruction bus (INB) 51. The EXU 20 is notified of the appearance of the instruction on the INB 51 by an AQWE signal 53 which is outputted from an OR gate 38 in the BTIBU 30 receiving an instruction capture-enable signal (QWE) 52 produced by the BCU 10 and a multiplexer control signal MPC produced by a timing control circuit 36 in the BTIBU 30. That is, the EXU 20 captures the instruction on the INB 51 in response to the AQWE signal 53. The QWE signal 52 is generated in synchronism with the fourth state signal T4.

The BTIBU 30 includes a branch address pointer (BAP) 31 which latches the branch address on the INA 50 in response to the BREQ signal 49. The branch address has 16 bits consisting of the 0th bit to the fifteenth bit, as mentioned before. The 0th bit is the least significant bit (LSB) and the fifteenth bit is the most significant bit (MSB). The first to fifth bits of the branch address latched in the BAP 31 are supplied to a decoder 33. This decoder 33, when activated by a decoding-enable signal DE supplied thereto, decodes the information represented by the supplied five bits and then energizes one of 32 selection lines coupled to a buffer 33. This means that the buffer 33 consists of 32 line buffers. Each of the line buffers has a one-bit valid flag storage area 321, a 10-bit branch address storage area 322 (for the sixth to fifteenth bits), and a 16-bit branch target instruction storage area 323. Since the area 323 is a 16-bit area, the 0th bit (LSB) of the latched branch address need not be supplied to the decoder 31.

The buffer 32 is further supplied with a buffer write-enable signal BWE and a buffer read-enable signal BRE. When the signal BWE is changed to an active high level, the areas 321, 322 and 323 of the line buffer selected by the decoder 33 are written with and thus store the logic "1" the sixth to fifteenth bits of the latched branch address and the data on the IDB 45, respectively. When the signal BRE is changed to an active high level, on the other hand, the data stored in the areas 321, 322, and 323 of the selected line buffer are read out therefrom and supplied to a first input terminal of an AND gate 35, a set of first input terminals of a comparator 34, and a set of first input terminals of the MPX 37, respectively. The comparator 34 has a set of second input terminals supplied with the sixth to fifteenth bits of the latched branch address and, when activated by an active high comparator-enable signal CE, compares the data supplied from the BAP 31 with that from the buffer 32. When the compared data are the same, the comparator 34 produces and supplies a high level output to a second input terminal of the AND gate 35 which further has a third input terminal supplied with a branch cycle signal BRC.

When the comparator output, the flag output and the signal BRC all are at the high level or logic "1" the AND gate 35 changes the branch hit signal BRH to the active high level which is in turn supplied to the BCU 10 and a timing control circuit 36. This circuit 36 is further supplied with the branch request signal BREQ, the hit state signal TH, and the fourth state signal T4 and then produces the above-mentioned timing control signals BRC, DE, CE, BWE, BRE and MPC. The multiplexer control signal MPC is supplied to the MPX 37. The MPX 37 selects the data outputted from the buffer 32 when the signal MPC takes the high level and the data on the IDB 45 when the signal MPC takes the low level.

Figure 2:
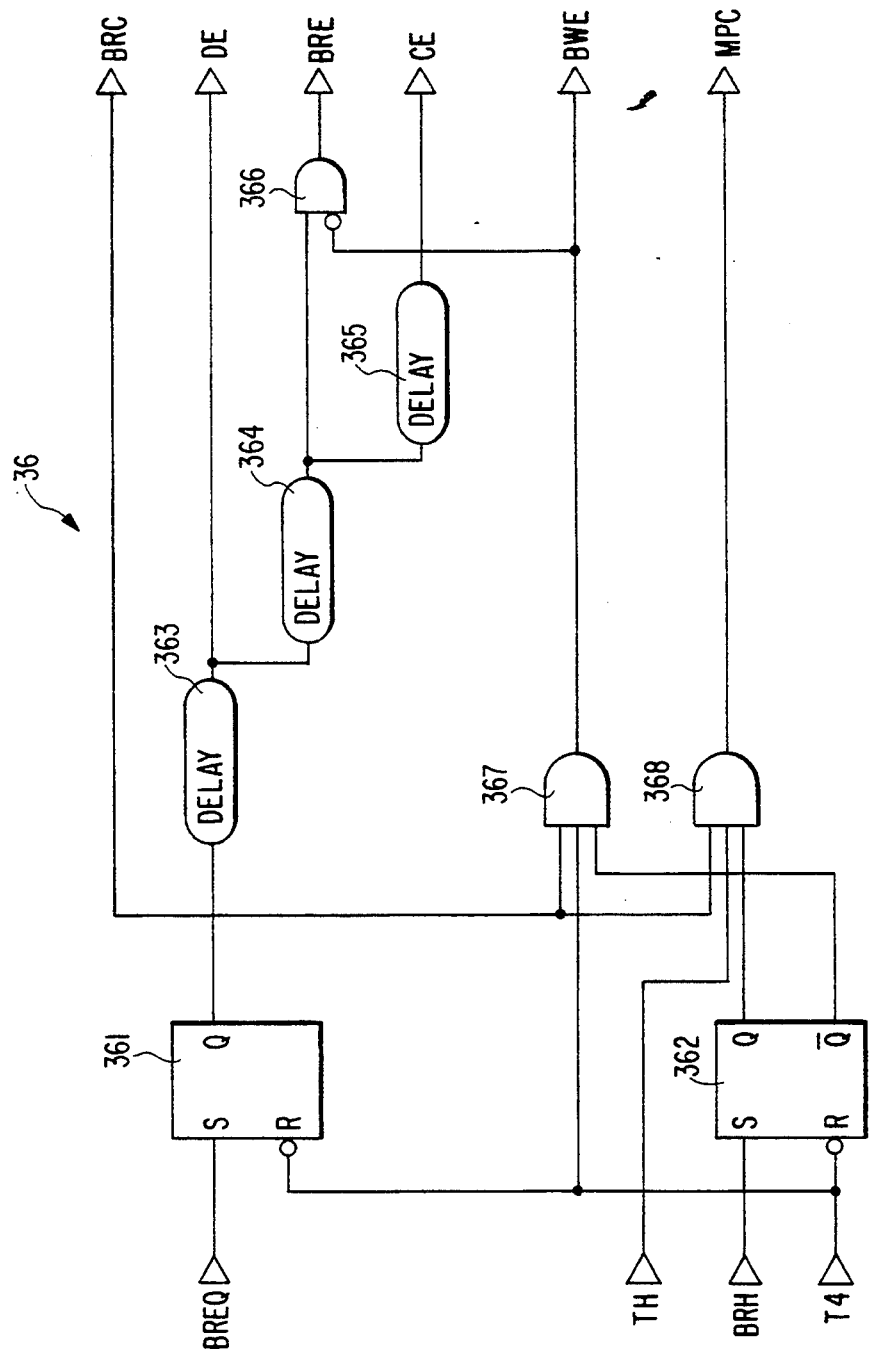
FIG. 2 is a logic circuit diagram representative of a timing control circuit in a branch target instruction buffer unit shown in FIG. 1.

Turning to FIG. 2, the timing control circuit 36 includes two flip-flop circuits (F/Fs) 361 and 362, three delay circuits 363, 364, and 365, and four AND gates 366, 367, and 368 which are connected as shown. Operation of this structure will be described in detail below.

Figure 3:
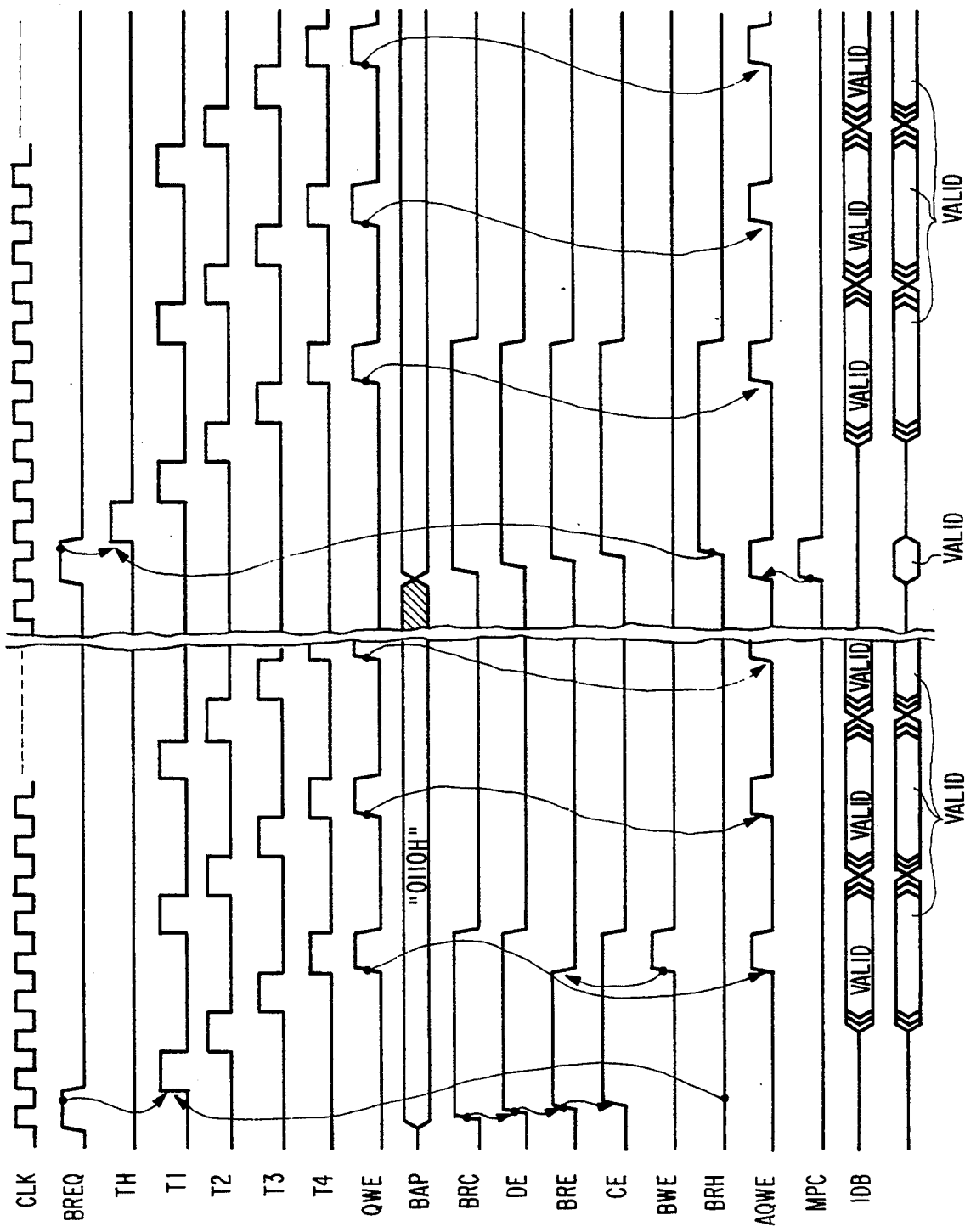
FIG. 3 is a timing chart for explaining the operation of the micrcomputer shown in FIG. 1.

An operation of the present microcomputer will be described below with reference to FIGS. 1 and 2 and also to FIGS. 3 and 4. The EXU 20 receives and executes each instruction supplied through the INB 51. Assume that the EXU 20 encounters a branch instruction having a branch address "0110H". The mark "H" indicates hexa-decimal notation. As the result of the execution of the branch instruction, the EXU 20 supplies the branch address "0110H" onto the INA 50 while producing the BREQ signal 49 in synchronism with a system clock CLK, as shown in FIG. 3. In response to the BREQ signal 49, the BAP 31 and FAP 101 both latch the branch address "0110H". Further, the F/F 361 (FIG. 2) of the timing control circuit 36 is set to produce the high level Q output. The timing signals BRC, DE, BRE and CE of the active high level are thereby generated sequentially with respective delay times determined by the delay circuits 363–365, as shown in FIG. 3. Since the first to fifth bits of the branch address are "01000B" ("B" representing a binary notation), the decoder 33 selects the eighth line buffer of the buffer 32. The flag area 321 of the buffer 32 is reset to zero upon the system reset, so that the flag information of the eighth line buffer is logic "0" as shown in FIG. 4A. By the buffer read-enable signal BRE, the logic "0" is read out of the flag area 321 and supplied to the AND gate 35. Therefore, the branch hit signal BRH outputted from the AND gate 35 is held at the inactive low level irrespective of the contents stored in the address area 322 of the eighth line buffer.

In response to the BREQ signal 49 and the inactive low level of the signal BRH, the BCU 10 judges the instruction at the branch address "0110H" as not being stored in the buffer 32 and then initiates a bus cycle for fetching the branch target instruction. This bus cycle consists of four states T1 to T4, as shown in FIG. 3. The branch target instruction is thereby read out of the branch address of the memory 2 and supplied to the MPX 37 through the SDB 4 and IDB 45.

Since the branch hit signal BRH is at the low level, the F/F 362 (FIG. 2) is maintained in the reset state to produce the low level Q output. Accordingly, the output of the AND gate 379, i.e. the multiplexer control signal MPC, is at the low level. The branch target instruction on the IDB 45 thus appears on the INB 51 trough the MPX 37, as shown in FIG. 3. The BCU 10 produces the instruction capture-enable signal QWE to cause the signal AQWE to change the active high level in synchronism with the fourth state signal T4. Thus, the EXU 20 captures and executes the branch target instruction.

In synchronism with the state signal T4, the AND gate 367 changes the buffer write-enable signal BWE to the active high level, whereas the buffer read-enable signal BRE is changed to the low level, as shown in FIG. 3. As a result, the eighth line buffer of the buffer 32 is written with and thus stores the logic "1" in the flag storage area 321, the address information of the sixth to fifteenth bits, "0000 0001 00B" of the branch address "0110H" in the address storage area 322, and the branch target instruction consisting of the one-byte instruction code at the address "0110H" and that at the address "0111H" in the instruction storage area 323, as shown in FIG. 4B. By the falling edge of the state signal T4, the F/F 361 is reset to change its output to the low level, so that the timing signals BRC, DE, CE and BWE are changed to the low level, as shown in FIG. 3.

Since the BCU 10 has performed the instruction fetch bus cycle responsive to the BREQ signal 49, it initiates consecutively the instruction fetch bus cycle at least twice by incrementing the content of the FAP 101 by two, as shown in FIG. 3. At this time, the F/F 361 is not set, so that the BTIBU 30 does not operate. That is, no instruction thus fetched thereafter is stored in the buffer 32. On the other hand, the EXU 20 executes in order the instructions in a new instruction stream starting from the branch target instruction at the branch address "0110H". As mentioned before, each time the EXU 20 produces the instruction prefetch request signal FREQ 48, the BCU 10 initiates the instruction fetch bus cycle by incrementing the content of the FAP 101 by two. The fetched instruction is transferred to the EXU 20 via the SDB 4, IDB 45, MPX 37, and INB 51.

In the course of the execution of the new instruction stream, assume that the peripheral unit 3 issues an interrupt request INT to the microcomputer 1. As well known in the art, the EXU 20 suspends the execution of the current instruction stream in response to the interrupt request INT and then saves the internal status thereof into a stack area (not shown). The EXU 20 thereafter produces the branch request signal BREQ 49 while supplying onto the INA 50 a branch address indicating the starting address of an interrupt program for the interrupt request INT. Assuming that the branch address is "5A83H" the decoder 33 responds to the first to fifth bits thereof, "00001B" to select the first line buffer of the buffer 32. Since the flag data stored therein is the logic "0" the BCU 10 initiates the bus cycle to read a branch target instruction from the memory 2, which is in turn supplied to the EXU 20, as described before. The EXU 20 thus starts to execute the interrupt program. The branch target instruction is further written into the first line buffer of the buffer 32 together with the logic "1" flag and the branch address information from the sixth to fifteenth bits, "0101 1010 10B" as shown in FIG. 4C It should be noted that the one-byte instruction code at the address "5A82H" and that at the address "5A83H" are stored in the instruction area 323 as the branch target instruction, because the BCU 10 reads one word (16 bits) as two bytes at a time from the memory 2. The BCU 10 then continues to perform the instruction fetch bus cycle at least twice, as mentioned before.

When the EXU 20 completes the interrupt program, it returns the saved internal status to resume the interrupted program.

Assume that the peripheral unit 3 issues another interrupt request INT. In response thereto, the EXU 20 produces the branch request BREQ 49 while supplying the branch address "5A83H" onto the INA 50. The BAP 31 and the FAP 101 latch that address, and the F/F 361 (FIG. 2) is set to produce the high level output. Since the first line buffer of the buffer 32 stores the logic "1" flag and the address information "0101 1010 10B" the branch hit signal BRH is changed to the active high level. The high level of the BRH signal is supplied to the BCU 10 along with the BREQ signal, so that the BCU 10 generates the hit state signal TH before initiating the bus cycle, as shown in FIG. 3. Since the F/F 362 (FIG. 2) is set by the high level BRH signal, the hit state signal TH causes the AND gate 368 to change the MPC signal to the high level. The MPX 37 thereby selects the first terminals at which the branch target instruction has already arrived from the buffer 32. The high MPC signal further changes the signal AQWE to the high level, as shown in FIG. 3. Thus, the branch target instruction responsive to the branch request caused by the interrupt request is transferred to the EXU 20 from the BTIBU 30 within one clock. At this time, while the one-byte instruction code at the address "5A82H" is also supplied to the EXU 20, this instruction code is disregarded since the EXU 20 knows the branch address, as well known in the art.

On the other hand, the BCU 10 initiates the bus cycle following the hit state TH. In this case, the BCU 10 receives the high level branch hit signal BRH, so that the instruction fetch bus cycle operation is performed on an instruction at the address "5A84H" by incrementing the content of the FAP 101. This instruction is captured by the EXU 20 in the fourth state T4. At this time, since the F/F 362 is in the set state, the AND gate 367 does not change the buffer write-enable signal BWE to the active high level even when the state signal T4 appears, as shown in FIG. 3. No instruction is thereby written into the buffer 32. The BCU 10 continues to perform the instruction fetch bus cycle at least twice, as mentioned before.

Similar operations to those described above are performed when the EXU 20 issues a branch request including the branch address "0110H" as the result of the execution of the branch instruction. This is because the branch target instruction is already stored in the buffer 32.

As described above in detail, each time the EXU 20 issues a branch request responsive to the execution of the branch instruction or the interrupt request INT, the BTIBU 30 checks whether or not a branch target instruction is stored in the buffer 32 and, if stored, transfers that instruction to the EXU 20 within one clock. If not stored, on the other hand, the BTIBU 30 causes the BCU 10 to initiate the bus cycle for fetching a branch target instruction and then stores the fetched instruction. The buffer 32 can store up to 32 branch target instructions.

Some branch address is often the same as another branch address in its first to fifth bits. For example, assume that the EXU 20 issues another branch request with a branch address "1290H". In this case, the first to fifth bits thereof are "01000B" so that the eighth line buffer of the buffer 32 is selected which stored the address information of "0000 0001 00B". On the other hand, the sixth to fifteenth bits of the newly requested branch address are "0001 0010 10B". Consequently, the AND gate 35 outputs the low level branch hit signal BRH. The BCU 10 thereby initiates the bus cycle for fetching the instruction at the address "1290H". The fetched branch target instruction is transferred to the EXU 20 and further is written into the eighth line buffer together with the logic "1" flag and the address information of "0001 0010 10B". The eighth line buffer is thus updated.

Figure 5:
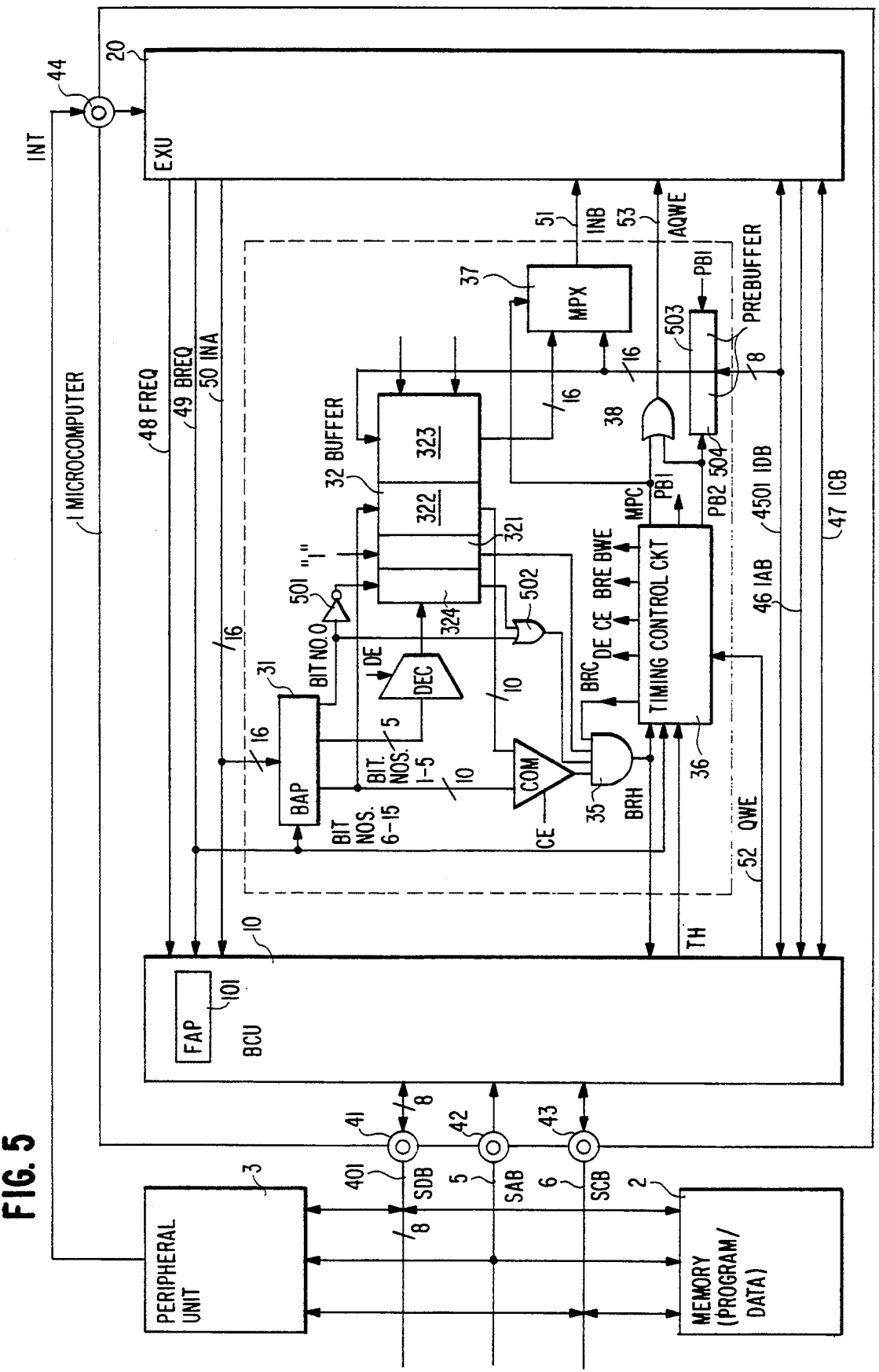
FIG. 5 is a block diagram representative of an information processing apparatus employing a microcomputer according to another embodiment of the present invention.

FIG. 5 shows a microcomputer system employing a microcomputer according to another embodiment of the present invention, in which the same elements as those shown in FIG. 1 are denoted by the same reference numerals, so that it is possible to omit further description thereof. This microcomputer is an 8-bit microcomputer, and thus a system data bus (SDB) and an internal data bus (IDB) both are 8-bit buses, as represented by the reference numerals 401 and 4501, respectively. However, the instruction bus (INB) 51 is 16 bits wide. Therefore, two one-byte prebuffers 503 and 504 are provided between the IDB 4501 and the MPX 37. The prebuffer 503 responds to a first prebuffer-enable signal PB1 to store and supply the information on the IDB 4501 to the less significant inputs of the MPX 37, whereas the prebuffer 504 responds to a second prebuffer-enable signal PB2 to store and supply the information on the IDB 4501 to the more significant inputs of the MPX 37. These signals PB1 and PB2 are generated by the timing control circuit 36. The signal PB2 is further supplied to the OR gate 38 in place of the signal AQWE which is supplied to the timing control circuit 36 in this embodiment.

The BTIBU 30 further includes an inverter 501 supplied with the 0th bit of the address information latched in the BAP 31. The output of the inverter 501 is supplied in common to an even-number storage area provided newly to each of the line buffers 32. The input to the inverter 501 and the output of the storage area 324 are ORed by an OR gate 502 whose output is in turn supplied to the AND gate 35 as a fourth input signal.

Figure 6:
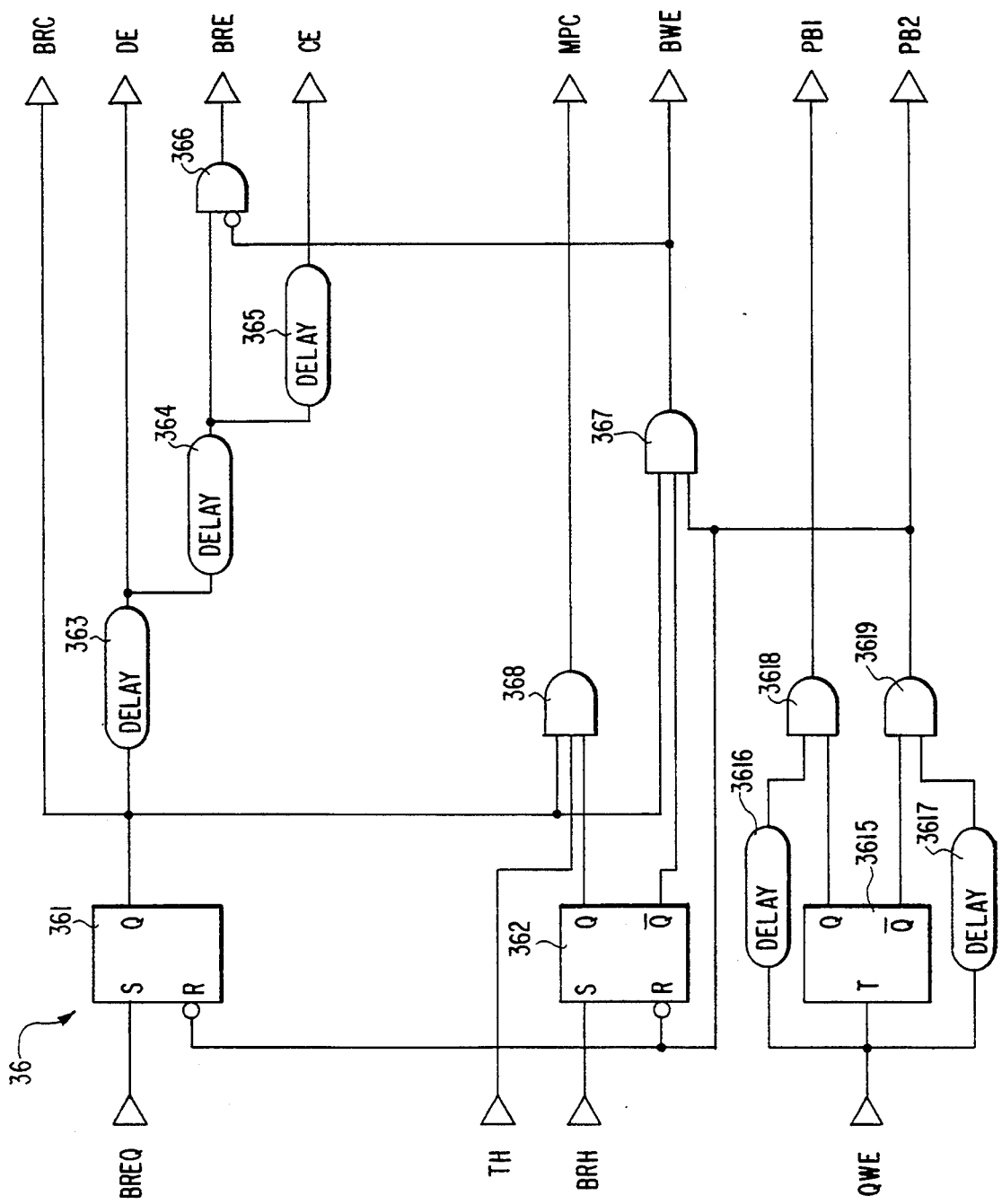
FIG. 6 is a logic circuit diagram representative of a timing control circuit in a branch target instruction buffer unit shown in FIG. 5.

Turning to FIG. 6, the timing control circuit 36 of the present microcomputer includes, in addition to the constituents shown in FIG. 2, one T-type flip-flop (T-F/F) 3651, two delay circuits 3616 and 3617 and two AND gates 3618 and 3619 connected as shown to produce the prebuffer-enable signals PB1 and PB2. Further, the signal PB2 is supplied to the AND gate 367 in place of the state signal T4.

Figure 7:
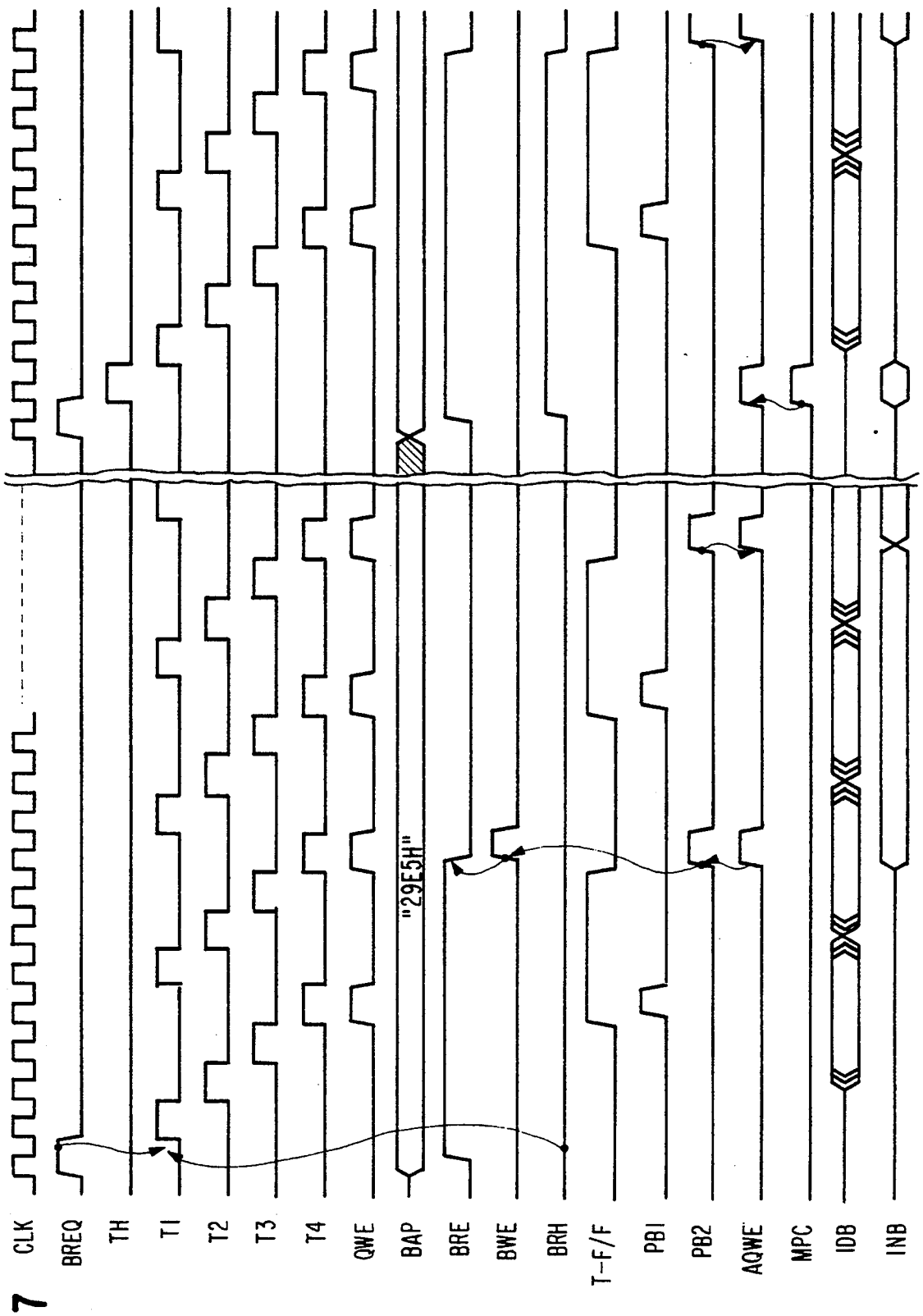
FIG. 7 is a timing chart for explaining the operation of the microcomputer shown in FIG. 5.
Figure 8A:
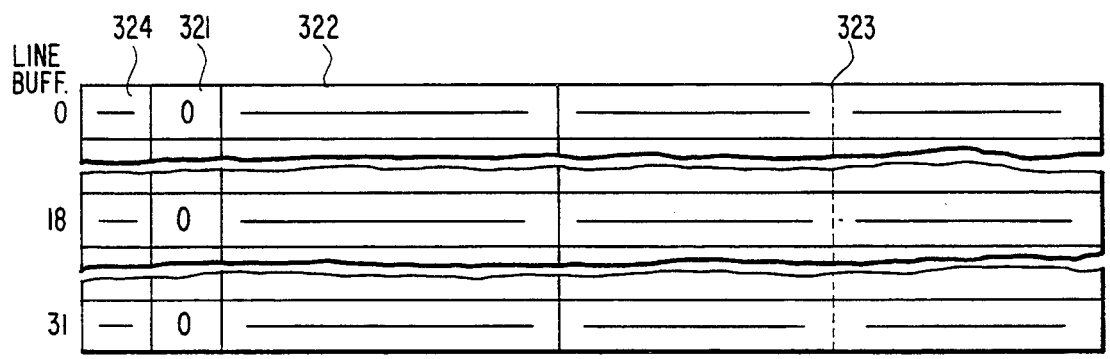
FIGS. 8A to 8C are diagrams explaining how the contents of a buffer shown in FIG. 5 are updated in the course of the operation of the microcomputer of FIG. 5.

In operation, when the EXU 20 produces the branch request signal BREQ 48 with a branch address "29E5H" in response to the execution of a branch instruction or an interrupt request INT, an 18th line buffer of the buffer 32 is selected by the decoder 33 in response to the first to fifth bits of the branch address, "10010B". Assuming that the flag storage area 321 stores the logic "0" as shown in FIG. 8A, the branch hit signal BRH is held at the low level, as shown in FIG. 7. Accordingly, the BCU 20 initiates the bus cycle for fetching a branch target instruction. The SDB 401 and the IDB 4501 are 8-bit buses, whereas the INB 51 is a 16-bit bus. Therefore, the BCU 20 performs the instruction fetch bus cycle twice consecutively. However, the BCU 20 generates the instruction capture-enable signal QWE in the fourth state T4 of each bus cycle.

By the first-generated signal QWE, the T-F/F 3615, the delay circuit 3616 and the AND gate 3618 produces the first prebuffer-enable signal PB1 to cause the prebuffer 503 to store the instruction at the address "29E5H". In response to the next generated signal QWE, the second prebuffer-enable signal PB2 is produced by the T-F/F 3615, the delay circuit 3617 and the AND gate 3619, so that the prebuffer 504 stores the instruction at the address "29E6H". The second prebuffer-enable signal PB2 further changes the signal AQWE to the active high level. The multiplexer control signal MPC is held at the low level. Thus, the branch target instruction is transferred to the EXU 20 from the BCU 10, as shown in FIG. 7.

Figure 8B:
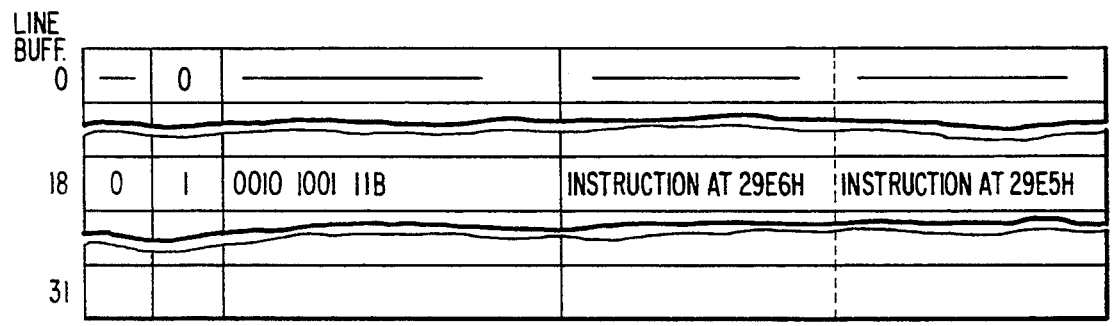

The second prebuffer-enable signal PB2 further causes the AND gate 367 (FIG. 6) to produce the active buffer write-enable signal BWE since the F/F 362 is at the reset state. As a result, the 18th line buffer of the buffer 32 is written with and thus stores the inverted 0th bit of the branch address derived from the inverter 501, i e the logic "0" in the storage area 324, the logic "1" in the flag storage area 321, the sixth to fifteenth bits of the branch address, i.e. "0010 1001 11B" in the address storage area 322, and the two one-byte instruction codes at the address "29E5H" and "29E6H" in the storage area 323, as shown in FIG. 8B. The BCU 20 continues to perform the instruction fetch bus cycle at least four times to fetch four bytes of instruction codes, as shown in FIG. 7.

Figure 8C:
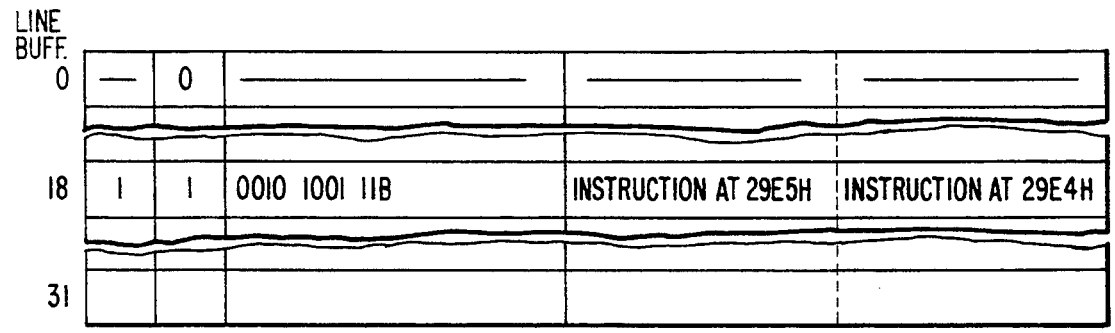
Figure 9:
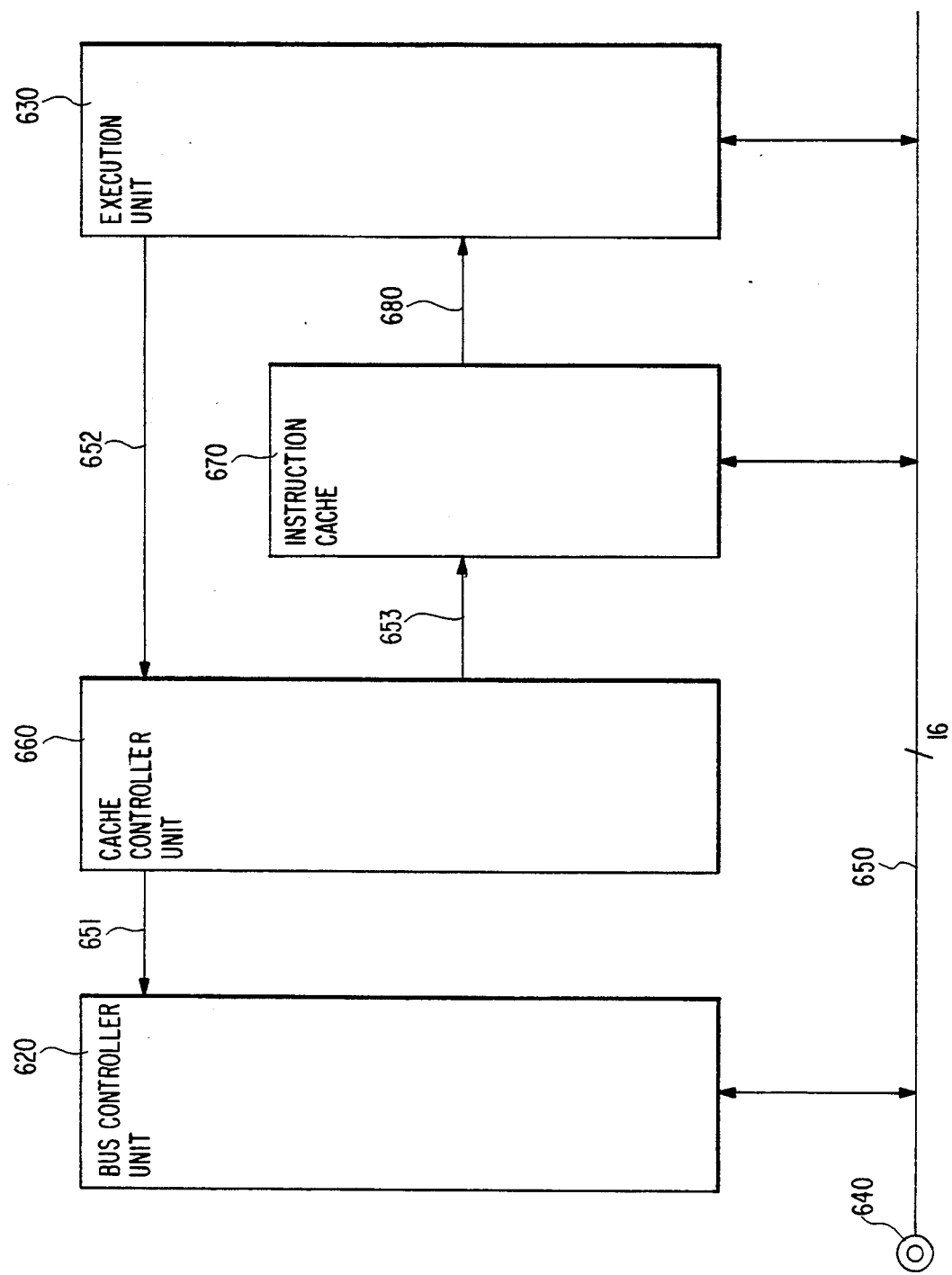
FIG. 9 is a block diagram of a conventional microcomputer system.

Assuming that the microcomputer 1 requires a branch to the address "29E4H" the 18th line buffer of the buffer 32 is selected again, and the contents thereof are read out therefrom. Although the read-out flag is the logic "1" the read-out information from the area 324 is the logic "0". Moreover, the 0th bit of the branch address is also the logic "0". Accordingly, the low level branch hit signal BRH is produced to cause the BCU 10 to initiate the instruction fetch bus cycle. Two one-byte instruction codes at the addresses "29E4H" and "29E5H" are thereby written into the 18th line buffer in the same manner as described hereinbefore, as shown in FIG. 8C. The storage area 324 is written with the inverted 0th bit of the branch address, i.e. the logic "1", however.

Assuming the EXU 20 requires to branch to the address "29E5H" again, the high level branch hit signal BRH is produced as shown in FIG. 7, because the 0th bit of the branch address and the data read out of the area 324 both are the logic "1". The control signal MPC is thereby changed to the high level to transfer to the EXU 20 the instruction codes at the addresses "29E4H" and "29E5H" within one clock, as shown in FIG. 7. The instruction code at the address "29E4H" is disregarded, however.

On the other hand, the BCU 10 initiates the bus cycle for fetching the instruction codes the address "29E6H" by incrementing the content of the FAP 101. These instruction codes are not stored in the BTIBU 30, as mentioned before.

The above-described operation is also performed when the EXU 20 issues a request to branch to the address "29E4H" because the information read out of the area 324 is at the logic "1".

Thus, the BTIBU 30.in the present embodiment can store up to 64 branch target instructions. Similarly to the first embodiment, the branch target instruction to be stored is updated when the first to fifth bits of the new branch address are the same as those of the stored branch address but the remaining bits are different from each other.

It is apparent that the present invention is not limited to the above embodiments, but may be modified and changed without departing from the scope and spirit of the invention.

What is claimed is:

1. A microcomputer comprising:

a bus control unit performing a bus cycle for fetching an instruction;

an execution unit executing an instruction supplied thereto and issuing a branch request including branch address information representative of a branch address to which an instruction stream to be executed by said execution unit is changed; and a branch target instruction buffer unit coupled to said bus control unit and said execution unit, said bus control unit being responsive to both of said branch request from said execution unit and a control signal from said branch target instruction buffer unit to initiate the bus cycle for fetching an instruction from said branch address to thereby output a branch target instruction, said branch target instruction buffer unit including:

a plurality of storage buffers for temporarily storing address information and an instruction associated with the stored address information;

a decoder circuit responding to said branch address information to select one of said storage buffers and to read out the address information and the instruction associated therewith from said one of said storage buffers in parallel with each other;

a detection circuit, coupled to receive said branch address information contained in said branch request and the address information read out of said one of said storage buffers, for producing a detection signal of an active level when said branch address information is the same as the address information read out of said one of said storage buffers, and a detection signal of an inactive level when said branch address information is not the same as the address information read out of said one of said storage buffers, said inactive level of said detection signal being supplied to said bus control unit as said control signal;

a selection control circuit, coupled to receive said branch target instruction from said bus control unit and the instruction read out of said one of said storage buffers, for selecting and supplying the instruction read out of said one of said storage buffers to said execution unit in response to said active level of said detection signal, and selecting and supplying said branch target instruction to said execution unit in response to said inactive level of said detection signal; and an information updating circuit for writing said branch target instruction and said branch address information associated therewith into said one of said storage buffers in response to said inactive level of said detection signal.

2. The microcomputer as claimed in claim 1, wherein said decoder circuit responds to less significant bits of said branch address information to select one of said storage buffers, wherein said detection circuit includes a comparator comparing more significant bits of said branch address information with the address information read out of said one of said storage buffers to produce said detection signal, and wherein said more significant bits of said branch address information are written into said one of said storage buffers by said information updating circuit in response to said inactive level of said detection signal.

3. The microcomputer as claimed in claim 1, wherein said selection control circuit includes a multiplexer having a control terminal supplied with said detection signal, a set of first terminals coupled to said storage buffers to receive the instruction therefrom and a set of second terminals coupled to said bus control unit to receive the instruction therefrom, said multiplexer selecting said first terminals in response to said active level of said detection signal and said second terminal in response to said inactive level of said detection signal.

4. The microcomputer as claimed in claim 1, wherein said execution unit issues said branch request in response to an interrupt request supplied thereto.

5. The microcomputer as claimed in claim 1, wherein said execution unit issues said branch request in response to execution of a branch instruction.

6. A microcomputer comprising:

an execution unit executing an instruction supplied thereto and issuing a branch request including address information representative of a branch address to which an instruction stream to be executed by said execution unit is changed, said branch address including a less significant bit part and a more significant bit part;

a bus control unit for performing a bus cycle for fetching an instruction; and a buffer unit coupled to said execution unit and said bus control unit, said buffer unit including;

a plurality of buffers, each temporarily storing address information and an instruction associated therewith;

means, responsive to said less significant bit part of said branch address, for selecting one of said buffers and for reading out the address information and the instruction associated therewith from said one of said buffers in parallel to each other;

means, responsive to said more significant bit part of said branch address and the address information read out of said one of said buffers, for producing a detection signal which takes an active level when the address information read out of said one of said buffers is the same as said more significant bit part of said branch address, said detection signal taking an inactive level when the address information read out of said one of said buffers is not the same as said more significant bit part of said branch address;

means, responsive to said active level of said detection signal, for supplying the instruction read out of said one of said buffers to said execution unit and for causing said bus control unit to perform the bus cycle for fetching an instruction from an address subsequent to said branch address, said instruction fetched from said address being subsequent to said branch address being supplied to said execution unit after said instruction is supplied from said one buffer to said execution unit;

means, responsive to said inactive level of said detection signal, for causing said bus control unit to perform the bus cycle for fetching an instruction from said branch address and to thereby output a branch target instruction; and means for supplying said branch target instruction to said execution unit and for writing said branch target instruction and said more significant bit part of said branch address into said one of said buffers.

7. The microcomputer as claimed in claim 6, wherein said instruction fetched from said address subsequent to said branch address is not written into said any one of said buffers.

8. The microcomputer as claimed in claim 6, wherein said bus control unit, after performing the bus cycle for fetching said branch target instruction, continues to perform a bus cycle for fetching another instruction, said another instruction being supplied to said execution unit and not being written into any one of said buffers.

9. The microcomputer as claimed in claim 6, wherein said execution unit issues said branch request in response to an interrupt request supplied thereto.

10. The microcomputer as claimed in claim 6, wherein said execution unit issues said branch request in response to execution of a branch instruction.

* * * * *